United States Patent
Zhang et al.

(10) Patent No.: US 12,458,814 B2
(45) Date of Patent: Nov. 4, 2025

(54) METHODS AND SYSTEMS FOR TREATING AN OBJECT

(71) Applicants: FUDAN UNIVERSITY SHANGHAI CANCER CENTER, Shanghai (CN); SHANGHAI UNITED IMAGING HEALTHCARE CO., LTD., Shanghai (CN)

(72) Inventors: Zhen Zhang, Shanghai (CN); Weigang Hu, Shanghai (CN); Lei Yu, Shanghai (CN); Jiazhou Wang, Shanghai (CN); Jun Zhao, Shanghai (CN); Yifeng Wang, Shanghai (CN); Jingjie Zhou, Shanghai (CN); Wei Zhang, Shanghai (CN); Xiao Gu, Shanghai (CN); Yige Zhang, Shanghai (CN)

(73) Assignees: FUDAN UNIVERSITY SHANGHAI CANCER CENTER, Shanghai (CN); SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 1042 days.

(21) Appl. No.: 17/305,051

(22) Filed: Jun. 29, 2021

(65) Prior Publication Data
US 2022/0314025 A1   Oct. 6, 2022

Related U.S. Application Data

(63) Continuation of application No. PCT/CN2021/093553, filed on May 13, 2021.

(30) Foreign Application Priority Data

Apr. 2, 2021   (CN) .......................... 202110362014.8

(51) Int. Cl.
*A61N 5/10*   (2006.01)

(52) U.S. Cl.
CPC ........... *A61N 5/103* (2013.01); *A61N 5/1071* (2013.01); *A61N 5/1084* (2013.01); *A61N 2005/1087* (2013.01); *A61N 2005/109* (2013.01)

(58) Field of Classification Search
None
See application file for complete search history.

(56) References Cited

U.S. PATENT DOCUMENTS

| | | | |
|---|---|---|---|
| 11,652,007 B2 * | 5/2023 | Lin | ...................... G01N 23/083 378/70 |
| 2008/0031406 A1 | 2/2008 | Yan et al. | |

(Continued)

FOREIGN PATENT DOCUMENTS

| | | |
|---|---|---|
| CN | 1522672 A | 8/2004 |
| CN | 1522674 A | 8/2004 |

(Continued)

OTHER PUBLICATIONS

International Search Report in PCT/CN2021/093553 mailed on Jan. 4, 2022, 8 pages.

(Continued)

*Primary Examiner* — Hoon K Song
(74) *Attorney, Agent, or Firm* — METIS IP LLC

(57) ABSTRACT

The present disclosure may disclose methods and systems for treating an object. The method may include imaging an object fixed on a positioning device using an imaging device. The method may include obtaining a plan image of the object. The method may include generating information of a region of interest (ROI) of the object based on the plan image of the object. The method may include generating a treatment plan based on the information of the ROI. The (Continued)

treatment plan may include a plan isocenter on the plan image. The method may further include treating a target portion of the object based on the treatment plan using a treatment device. The object may be fixed on the positioning device from a moment that the object is started to fixed on the positioning device to an end of the treatment of the target portion.

20 Claims, 7 Drawing Sheets

(56) References Cited

U.S. PATENT DOCUMENTS

| | | | | |
|---|---|---|---|---|
| 2010/0147835 | A1* | 6/2010 | Mulpuri | H01L 21/02491 219/121.85 |
| 2010/0296070 | A1* | 11/2010 | Shibazaki | G03F 7/707 355/53 |
| 2011/0186914 | A1* | 8/2011 | Cheng | H01L 29/66772 257/E21.177 |
| 2013/0173214 | A1* | 7/2013 | Yamashita | G01B 7/023 702/170 |
| 2014/0064445 | A1* | 3/2014 | Adler | G01N 23/083 378/43 |
| 2016/0213337 | A1 | 7/2016 | Coppens et al. | |
| 2018/0064955 | A1* | 3/2018 | Iseki | H04N 13/275 |
| 2019/0099619 | A1 | 4/2019 | Maltz | |
| 2020/0016432 | A1* | 1/2020 | Maolinbay | A61B 6/032 |
| 2020/0086143 | A1 | 3/2020 | Maltz et al. | |
| 2020/0375560 | A1 | 12/2020 | Naylor et al. | |
| 2021/0016109 | A1* | 1/2021 | Sjölund | A61N 5/1031 |
| 2021/0370094 | A1* | 12/2021 | Honda | A61N 5/1081 |
| 2022/0386987 | A1* | 12/2022 | Camps | A61B 5/0205 |

FOREIGN PATENT DOCUMENTS

| | | |
|---|---|---|
| CN | 102824693 A | 12/2012 |
| CN | 104548372 A | 4/2015 |
| CN | 106215331 A | 12/2016 |
| CN | 107596578 A | 1/2018 |
| CN | 108852400 A | 11/2018 |
| CN | 110292723 A | 10/2019 |
| CN | 112316318 A | 2/2021 |
| JP | 2010057810 A | 3/2010 |
| WO | 2015015343 A1 | 2/2015 |

OTHER PUBLICATIONS

Written Opinion in PCT/CN2021/093553 mailed on Jan. 4, 2022, 9 pages.

* cited by examiner

METHODS AND SYSTEMS FOR TREATING AN OBJECT

CROSS-REFERENCE TO RELATED APPLICATION

This application is a Continuation of International Application No. PCT/CN2021/093553, filed on May 13, 2021, which claims priority of Chinese Patent Application No. 202110362014.8, filed on Apr. 2, 2021, the contents of each of which are hereby incorporated by reference.

TECHNICAL FIELD

The present disclosure relates to the field of medical technology, in particular, to methods and systems for treating an object.

BACKGROUND

Radiotherapy treatment is widely used for treating cancers. Before a patient receives a radiotherapy treatment, a doctor may determine and/or modify a radiotherapy treatment plan according to an illness condition of the patient. The radiotherapy treatment may be performed on the patient based on the treatment plan. However, during the determination and/or the modification of the treatment plan, the patient may need to wait for a relatively long time during which the structure of a tumor or other diseased tissues (e.g., the tissues surrounding the tumor) of the patient may change. For example, the tumor may grow, deform, or shrink. The patient may need to go to the hospital to be reexamined for a plurality of times and the treatment plan may need to be updated, thereby reducing the accuracy of the radiotherapy treatment, prolonging the treatment time, and reducing the efficiency of the radiotherapy treatment. Therefore, it is desirable to provide methods and systems for treating an object.

SUMMARY

In one aspect of the present disclosure, a method for treating an object is provided. The method may include imaging an object fixed on a positioning device using an imaging device. The method may include obtaining a plan image of the object. The method may include generating information of a region of interest (ROI) of the object based on the plan image of the object. The method may include generating a treatment plan based on the information of the ROI. The treatment plan may include a plan isocenter on the plan image. The method may further include treating a target portion of the object based on the treatment plan using a treatment device. The object may be fixed on the positioning device from a moment that the object is started to fixed on the positioning device to an end of the treatment of the target portion.

In another aspect of the present disclosure, a system for treating an object is provided. The system may include a positioning device, an imaging device, a treatment device, and a control device. The positioning device may be configured to position an object and position the object relative to the imaging device or the treatment device. The imaging device may be configured to image the object. The treatment device may be configured to treat a target portion of the object based on a treatment plan. The control device may be configured to generate, based on a plan image acquired by the imaging device, information of a target area of the target portion, obtain a plan isocenter, and determine the treatment plan based on the plan isocenter and the information of the target area.

In yet another aspect of the present disclosure, a non-transitory computer readable medium is provided. The non-transitory computer readable medium may include at least one set of instructions, wherein when executed by one or more processors of a computing device, the at least one set of instructions causes the computing device to perform a method. The method may include imaging an object fixed on a positioning device using an imaging device. The method may include obtaining a plan image of the object. The method may include generating information of a region of interest (ROI) of the object based on the plan image of the object. The method may include generating a treatment plan based on the information of the ROI. The treatment plan may include a plan isocenter on the plan image. The method may further include treating a target portion of the object based on the treatment plan using a treatment device. The object may be fixed on the positioning device from a moment that the object is started to fixed on the positioning device to an end of the treatment of the target portion.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
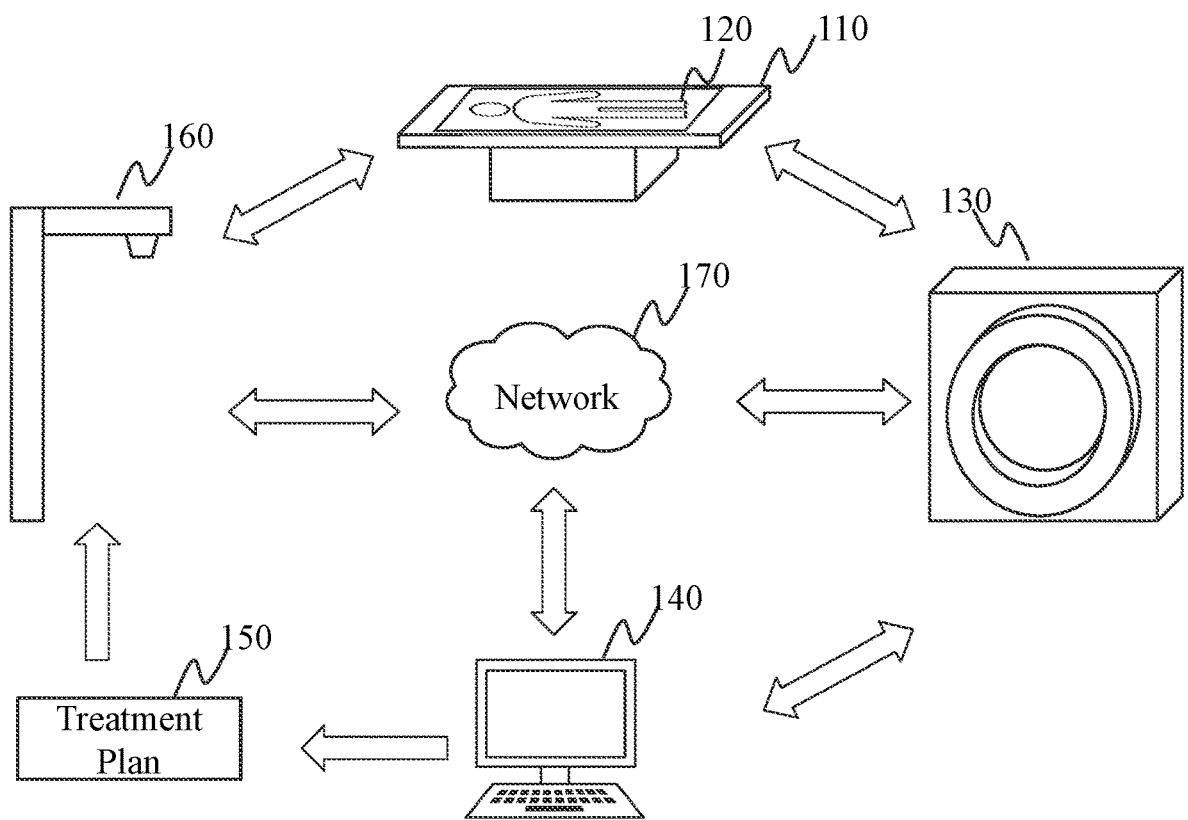
FIG. 1 is a schematic diagram illustrating an object treatment system according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps can be processed in reverse order or simultaneously. Besides, one or more other operations may be added to the flow charts, or one or more operations may be omitted from the flow chart.

FIG. 1 is a schematic diagram illustrating an object treatment system according to some embodiments of the present disclosure.

As shown in FIG. 1, in some embodiments, a workflow for performing a radiotherapy treatment on an object 120 may be executed by the object treatment system 100. The object treatment system 100 may include a positioning device 110, an imaging device 130, a control device 140, a treatment device 160, and a network 170. In some embodiments, the object treatment system 100 may include all of or a portion of the positioning device 110, the imaging device 130, the control device 140, the treatment device 160, and the network 170. In some embodiments, the object treatment system 100 may include an image-guided radiotherapy system having both an imaging function and a radiotherapy treatment function. In some embodiments, the imaging function and the radiotherapy treatment function of the object treatment system 100 may share the positioning device 110. In some embodiments, the imaging device 130 and the treatment device 160 may be integrated into a single medical device, such as a radiotherapy device disclosed in Chinese Patent Application No. CN106924888A. In some embodiments, the imaging device 130 and the treatment device 160 may not be integrated into a single device (e.g., the imaging device 130 and the treatment device 160 may be independent of each other), which will not be limited in the present disclosure.

In some embodiments, a patient may be fixed on the positioning device 110, imaged by the imaging device 130, and/or treated by the treatment device 160. A doctor may control the positioning device 110, the imaging device 130, and/or the treatment device 160, and/or perform an examination and/or controlling on the patient through the control device 140. The control device 140, the positioning device 110, the imaging device 130, and/or the treatment device 160 may be connected via the network 170. For example, the patient (e.g., a cancer patient) may be fixed on a treatment couch and scanned by a CT device, the doctor may determine a treatment plan 150 used in radiotherapy treatment of the object 120 through the control device 140, and then the patient may be treated using the treatment device 160 based on the treatment plan 150.

In some embodiments, other objects may be detected and/or treated based on related operations induced by one or more corresponding operators through terminal(s). For example, a component, a mechanical part, or the like, may be detected and/or processed. In some embodiments, the imaging device 130 may perform a first-level safety inspection on a good, e.g., using an X-ray fluoroscopy, and the treatment device 160 may process the good, such as perform an explosive detection. In some embodiments, the imaging device 130 may scan a living body, and the treatment device 160 may take a sample of the living body. In some embodiments, if an interventional treatment is performed on the patient, the treatment device 160 may include a surgical robot.

The positioning device 110 may be configured to position the object 120 relative to the imaging device 130 and/or the treatment device 160. In some embodiments, the positioning device 110 may include various components for positioning the object 120. For example, the positioning device 110 may include a treatment couch having a positioning function. The positioning device 110 may include a solid positioning component, such as a vacuum pad, a mask, etc. In some embodiments, the positioning device 110 may fix a posture of the object 120 so that a relative position of different portions of a body part of the object 120 may be unchanged (or substantially unchanged). For example, the object 120 may be fixed with a posture such as a lying flat posture, a bending knee posture, etc. The object 120 may be kept in a same (or substantially same) fixed state by the positioning device 110 until subsequent one or more treatments (or treatment fractions) are completed, thereby facilitating subsequent treatment(s). More descriptions regarding the positioning device 110 may be found elsewhere in the present disclosure. See, e.g., FIG. 7 and the relevant descriptions thereof.

The imaging device 130 may be configured to image the object 120 and generate data (e.g., image data) related to the object 120. For example, the imaging device 130 may scan the object 120 and generate an image associated with the object 120. The data associated with the object 120 may include an image of a target area of a target portion (e.g., a cancer portion, a lesion portion, etc.) of the object 120. In some embodiments, the target area may include an area of the target portion, an area that the target portion may invade, etc. In some embodiments, the imaging device 130 may include a medical imaging device (e.g., a CT imaging device, an MRI device, a CBCT imaging device, a DR device, a PET imaging device, an SPECT imaging device, a PET-CT imaging device, a PET-MR imaging device, an ultrasonic device, an ECT imaging device, etc.).

The control device 140 may be configured to generate information of an ROI of the object 120 based on the data related to the object 120 generated by the imaging device 130. The control device 140 may obtain information of a plan isocenter. The control device 140 may determine the treatment plan 150 based on the plan isocenter and the information of the ROI. In some embodiments, the control device 140 may be connected to the imaging device 130 and the treatment device 160, respectively.

The treatment plan 150 may be configured to be used to instruct how to perform the treatment (e.g., radiotherapy) on the object 120. For example, the treatment plan 150 may be configured to indicate how one or more beams of the radiotherapy are delivered to the ROI of the object 120. In some embodiments, the treatment plan 150 may provide a total dose (e.g., 0.1 Gy, 10 Gy, 50 Gy, 100 Gy, etc.) required for the radiotherapy treatment, a total dose distribution of the ROI, etc. In some embodiments, the treatment plan 150 may include an organ at risk of the object 120 or a contour of the organ identified before a treatment process, or the like, or any combination thereof.

The treatment plan 150 may provide a working parameter set related to the treatment (e.g., a radiotherapy treatment). The working parameter set may indicate one or more radiation fields that the treatment device may implement in the treatment(s). The working parameter set may include one or more machine radiation parameters, one or more geometrical parameters, or the like, or any combination thereof. The machine radiation parameter(s) may include a dose rate (e.g., MUs/min) of a radiation source, a duration of radiation, a modality type (e.g., photons, electrons, etc.) of the radiation source, or the like, or any combination thereof. The geometrical parameter(s) may include an angle of a gantry of the treatment device at a certain time, a rotation speed of the gantry at a certain time, an angle of a collimator of the treatment device at a certain time, a rotation speed of the collimator at a certain time, a leaf setting parameter of a multi-leaf collimator (e.g., a parameter value of an individual leaf of the multi-leaf collimator, etc.) of the treatment device, a position and/or an angle of the treatment device 160, or the like, or any combination thereof.

The treatment device 160 may be configured to treat the object 120. For example, the treatment device 160 may perform a radiotherapy treatment on the object 120. In some embodiments, the treatment device 160 may include a radiotherapy device, such as a medical linear particle accelerator (LINAC) device, a heavy ion therapy machine, a neutron therapy machine, a proton therapy machine, a gamma knife, or the like, or any combination thereof. In some embodiments, the treatment device 160 may include a treatment head, a gantry, a collimator, etc. In some embodiments, the treatment head may include a radiation source that may emit radiation beams to the object 120. The radiation beams may include particle beams (e.g., neutral beams, proton beams, heavy ion beams, electron beams, etc.), and photon beams (e.g., an X-ray, a γ ray, etc.), or the like, or any combination thereof.

The network 170 may be configured for information transmission between different components of the object treatment system 100 or may perform information transmission between the object treatment system 100 and an external device. The network 170 may connect a portion or all of the devices/components described according to some embodiments of the present disclosure. The network 170 may be implemented in various ways.

Figure 4:
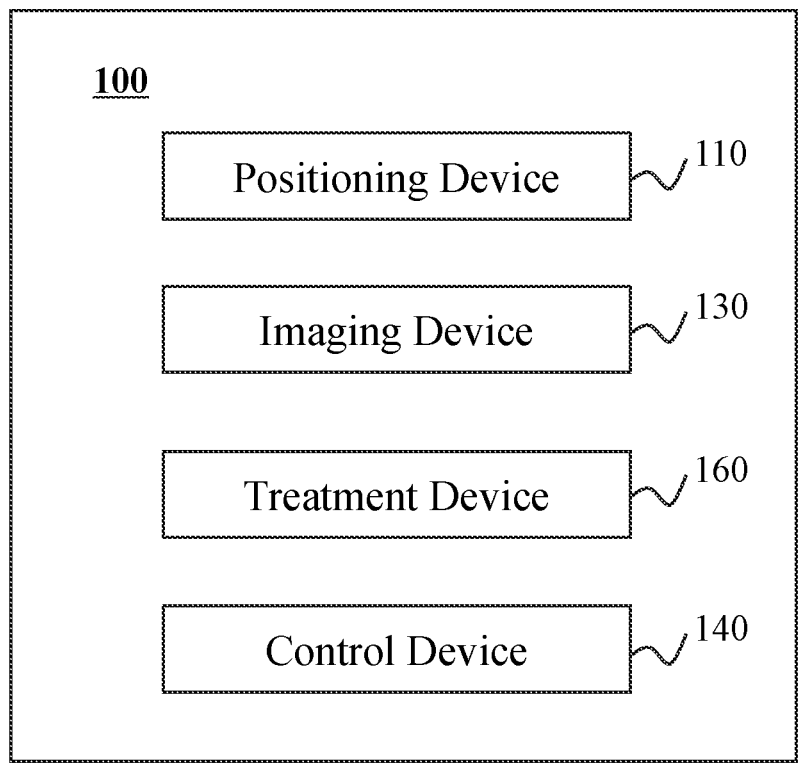
FIG. 4 is a block diagram illustrating an exemplary object treatment system according to some embodiments of the present disclosure.
Figure 5:
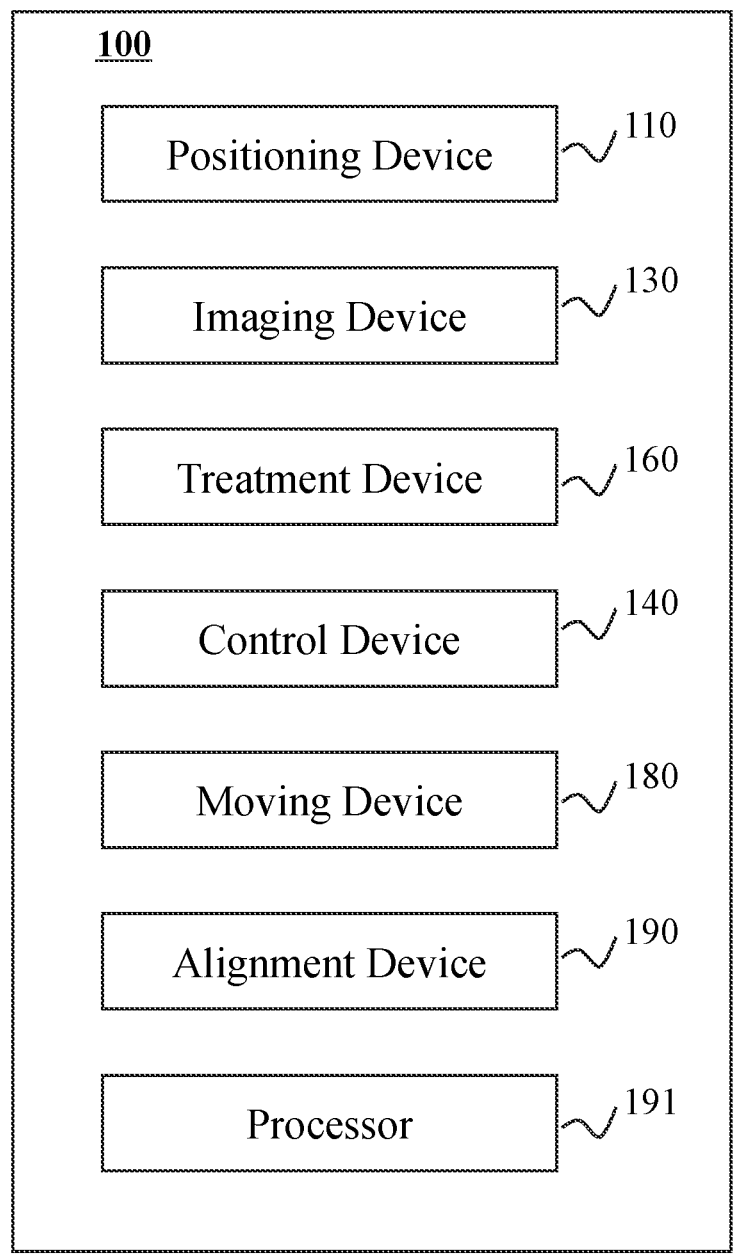
FIG. 5 is a block diagram illustrating an exemplary object treatment system according to some embodiments of the present disclosure.

In some embodiments, the object treatment system 100 may include a processor (e.g., a processor 191 shown in FIG. 5). The processor may be configured to perform at least one of the following operations: reconstructing a plan image based on the image data of the object 120, determining the treatment plan 150 based on the plan image, and/or verifying the treatment plan 150. In some embodiments, the processor may be an independent component. In some embodiments, the processor may be integrated into the imaging device 130, the control device 140, and/or the treatment device 160. More descriptions regarding the object treatment system 100 may be found elsewhere in the present disclosure. See, e.g., FIG. 4 and FIG. 5 and the relevant descriptions thereof.

Figure 2:
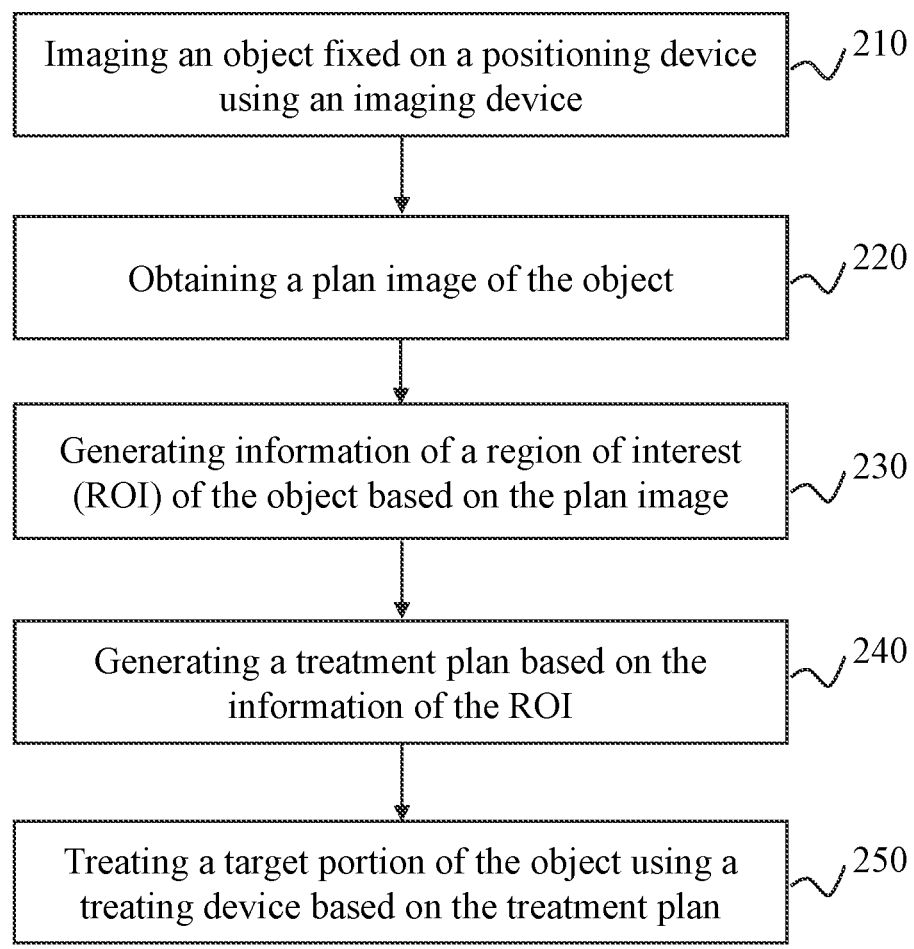
FIG. 2 is a flowchart illustrating an exemplary process for treating an object according to some embodiments of the present disclosure.

FIG. 2 is a flowchart illustrating an exemplary process for treating an object according to some embodiments of the present disclosure.

In some embodiments, at least a portion of the process 200 may be implemented by one or more devices or components of the object treatment system 100 illustrated in FIG. 1. The process 200 may include one or more of the following operations. The operations of the illustrated process 200 presented below are intended to be illustrative. In some embodiments, the process 200 may be accomplished with one or more additional operations not described, and/or without one or more of the operations discussed. Additionally, the order in which the operations of the process 200 as illustrated in FIG. 2 and described below is not intended to be limiting.

In 210, an imaging device (e.g., the imaging device 130) may image an object (e.g., object 120) fixed on a positioning device (e.g., the positioning device 110).

In some embodiments, the object 120 may be an object (e.g., a patient) to be treated. In some embodiments, a doctor may guide the object 120 fixed on the positioning device 110 to be positioned based on a position of a lesion of the object 120. In some embodiments, through positioning the object 120, the position of a target portion (e.g., a lesion) of the object may be caused to be close to or located at an isocenter of the treatment device 160 (also referred to as a machine isocenter of the treatment device 160). In some embodiments, the object may be fixed using the positioning device 110 (e.g., a vacuum pad, a mask, etc.). The object 120 may be kept in a fixed state using the positioning device 110 until subsequent treatment(s) (or treatment fractions) are completed, thereby facilitating the subsequent treatment(s). The isocenter of the treatment device 160 may refer to a rotation isocenter of a treatment head of the treatment device 160, that is, a treatment isocenter of the treatment device 160. More descriptions regarding the positioning of the object 120 may be found elsewhere in the present disclosure.

The object 120 may be fixed on the positioning device 110 in various ways. In some embodiments, the object 120 may be fixed on the positioning device 110 under the guidance of the doctor. For example, the doctor may guide the object 120 to be positioned to a standard position of the positioning device 110, and the object 120 may be fixed by the positioning device 110 through a fixing function of the positioning device 110, thereby improving the positioning accuracy of the object 120 relative to the positioning device 110 and facilitating the subsequent treatment(s) (e.g., radiation examination(s) and/or treatment(s)). Merely by way of example, the positioning device 110 may include a vacuum pad. After the object 120 is lying flat on the vacuum pad, the doctor may guide the object 120 to pose an instructed posture and perform a vacuum operation on the vacuum pad to fix the object 120 with the instructed posture.

In some embodiments, the object 120 may be fixed on the positioning device 110 through an intelligent guidance device. In some embodiments, the intelligent guidance device may be configured to guide the object 120 to determine a fixed position and/or a posture. For example, the intelligent guidance device may guide the object 120 to determine a corresponding positioning device 110 through a voice prompt and/or a screen display, and prompt the object 120 to be fixed on the positioning device 110 with the instructed posture (e.g., a lying flat posture). The intelligent guidance device may include a monitoring device (e.g., a camera). The monitoring device of the intelligent guidance device may be configured to collect current position information and/or a posture of the patient in real time. In some embodiments, the intelligent guidance device, a control device (e.g., the control device 140), and/or a processor (e.g., the processor 191) may compare the collected real-time position information and/or the posture with a standard positioning guidance and provide a comparison result to the patient, so that the patient may make adjustment according to the comparison result.

In some embodiments, the doctor may guide the object 120 to be fixed on the positioning device 110 in a remote guidance manner. For example, the doctor may obtain a real-time video of the object 120 through the monitoring device (e.g., a camera), and guide the object 120 to be fixed on the positioning device 110 in a voice interaction manner.

In some embodiments, the doctor or the intelligent guidance device may prompt the object 120 placed on the positioning device 110 to adjust the posture. After the doctor and/or the intelligent guidance device confirm that the posture of the object 120 is adjusted correctly, the object 120 may be fixed on the positioning device 110 as described above.

In some embodiments, the intelligent guidance device may be connected to other devices (e.g., a CT scan device, a treatment device, etc.), and guide, according to information of the object 120, the object 120 to be fixed on the positioning device 110. For example, the intelligent guidance device may obtain, from the control device 140, information that a lower leg of the object 120 is to be scanned, and the intelligent guidance device may guide the object 120 to be fixed on the positioning device 110 in a bending knee posture.

In some embodiments, the object 120 may be fixed on the positioning device 110 in various manners. In some embodiments, the doctor may detect and determine that the object 120 is fixed on the positioning device 110 through the monitoring device (e.g., a camera). For example, the camera may obtain an image of a space accommodating the positioning device 110 and the object 120. The doctor or the control device 140 may recognize (e.g., using an image recognition technology), based on the image, whether the position of the object 120 after being fixed on the positioning device 110 is accurate, whether the fixation is stable, or the like, or any combination thereof. In response to that a recognition result meets a predetermined requirement, the doctor or the control device may determine that the object 120 is fixed on the positioning device 110. In response to that the recognition result does not meet the predetermined requirement (e.g., the fixed position of the object is not accurate, the fixation is unstable, etc.), the doctor or the control device may adjust the fixed position, a fixing mode, fixing tightness of the object 120, or the like, or any combination thereof.

In some embodiments, the intelligent guidance device may receive input information after the object 120 is placed on the positioning device 110, and determine whether the object 120 is fixed on the positioning device 110. For example, the intelligent guidance device may receive the input information such as position information of the object 120 (e.g., a relative position of the object 120 and the positioning device 110, a relative position of the positioning device 110 and the imaging device 130, etc.) after the object 120 is placed on the positioning device 110, whether the object 120 is stable after being fixed, or the like, or any combination thereof. The intelligent guidance device may process the input information and output a determination result indicating whether the object 120 is fixed on the positioning device 110. For example, the determination result may include "YES" or "NO". In response to that the determination result is "YES", the intelligent guidance device may determine that the object 120 is fixed on the positioning device 110. In response to that the determination result is "NO", the intelligent guidance device may prompt the object 120, for example, the intelligent guidance device may prompt that the relative position of the object 120 and the positioning device 110 is not accurate, or the posture of the object 120 fixed on the positioning device 110 is not standard, etc.

In some embodiments, after the object 120 is fixed on the positioning device 110, the object 120 may be imaged by the imaging device 130. For example, the doctor may image the object 120 by performing a medical scan on the object 120 using the imaging device 130.

More descriptions regarding the imaging device 130 may be found elsewhere in the present disclosure. See, e.g., FIG. 1 and FIG. 4, and the relevant descriptions thereof. More descriptions regarding the image data of the object 120 acquired by the imaging device 130 may be found elsewhere in the present disclosure. See, e.g., operation 220 and the relevant descriptions thereof.

In 220, a plan image of the object may be obtained.

A plan image may include or refer to image data used for determining a treatment plan. In some embodiments, the plan image may include but is not limited to medical image data commonly used in the field, such as CT image data, MRI image data, CBCT image data, DR image data, PET image data, SPECT image data, PET/CT image data, PET/MR image data, ultrasound image data, ECT image data, etc.

In some embodiments, the plan image of the object 120 may be obtained by the imaging device 130. For example, the plan image of the object 120 may be obtained when the object 120 is moved to a scanning area of the imaging device 130 using the positioning device 110.

In 230, information of an ROI of the object may be generated based on the plan image.

The ROI may include a tissue, an organ, or any other medical region of interest. For example, the ROI may include a lesion (e.g., a tumor) portion in a CT scan image or a segmented image of the object 120, or a target area corresponding to a position of a lesion and/or an organ-at-risk area around the target area.

In some embodiments, the plan image obtained in operation 220 may be input in the object treatment system 100, and the object treatment system 100 may automatically generate information of the ROI based on the plan image. In some embodiments, the object treatment system 100 may recognize information of the target portion of the object 120 based on the plan image, and segment the plan image base on the information of the target portion to obtain the information of the ROI. The information of the target portion may include lesion information or other information such as medical history information, disease type information, etc. In some embodiments, the information of the target portion may be directly input by a doctor, or may be automatically determined based on image data, e.g., using an automatic delineation algorithm such as a neural network algorithm. In some embodiments, when generating the information of the ROI, the object treatment system 100 may generate information of the organ-at-risk information for reference or use in subsequent treatment(s).

In some embodiments, the ROI may be manually drawn by the doctor.

In some embodiments, after obtaining the information of the ROI, the object treatment system 100 may prompt the information of the ROI to an operator (e.g., the doctor, a physicist, etc.). The operator may confirm the information of the ROI or modify the information of the ROI and confirm the modified information of the ROI. In some embodiments, the object treatment system 100 may further prompt information of the organ-at-risk for operator's reference. In some embodiments, the object treatment system 100 may promote the information of the ROI after the information of the ROI is generated, so that the operator may modify and/or confirm the information of the ROI automatically segmented by the object treatment system 100. It should be understood that the information of the ROI may be promoted in various manners. For example, the information of the ROI may be promoted on a display screen, in a sound manner, in a light manner, in a voice manner, or the like, or any combination thereof.

In some embodiments, the object treatment system 100 may automatically generate a plan isocenter. In some embodiments, a difference may be formed between the automatically generated plan isocenter and a plan isocenter (e.g., a positioning isocenter formed during positioning the object 120) determined by the doctor. On this occasion, the doctor may fine-tune the positioning of the object 120 (e.g., by adjusting a position of a couch board of a treatment couch) based on the plan isocenter prompted by the object treatment system 100 and the plan image. The doctor may modify, update, and/or confirm the plan isocenter.

In some embodiments, after the plan image of the object 120 is obtained, a user may confirm whether a one-stop workflow is performed. The object treatment system 100 may receive user's confirmation information for the workflow. For example, the user may confirm that the one-stop workflow is to be performed, and the object treatment system 100 may automatically generate information of the ROI in response to the user's confirmation.

In some embodiments, the one-stop workflow may include a workflow associated with positioning, imaging, treating, and/or resetting the object.

In 240, a treatment plan (e.g., the treatment plan 150) may be generated according to the information of the ROI.

A treatment plan may refer to a plan for performing corresponding treatment on an object (e.g., the object 120). In some embodiments, the treatment plan may include the plan isocenter on the plan image. The plan isocenter may refer to a point defined in the plan image, which may represent a point located at the machine isocenter of the treatment device 160 when the object 120 is treated. The plan isocenter may be an important parameter in radiotherapy treatment, and the object 120 may need to be positioned so that the plan isocenter may coincide with the isocenter of the treatment device 160 before the radiotherapy treatment is performed. In some embodiments, the treatment plan may further include one or more parameters related to operation(s) of the treatment device 160, such as a count of rays, angle data of each ray, a dose value and/or dose distribution data, a position of a multi-leaf collimator, an angle of a gantry, a rotation speed of the gantry, an angle of a collimator, a rotation direction of the collimator, a couch code value, or the like, or any combination thereof.

In some embodiments, the object treatment system 100 may automatically generate the plan isocenter based on the plan image. For example, after automatically generates the information of the ROI based on the plan image, the object treatment system 100 may automatically generate the plan isocenter based on the information of the ROI.

In some embodiments, the object treatment system 100 may determine the plan isocenter based on user's input. For example, the user may directly operate on the plan image to determine the position of the plan isocenter and input it into the object treatment system 100. The object treatment system 100 may receive the user's input and determine the plan isocenter.

In some embodiments, during fixing the object 120 on the positioning device 110, the treatment plan may be determined online based on the information of the ROI. For example, after the CT scan is performed on the object 120, the object 120 may be fixed on the positioning device 110, and the control device 140 may determine the treatment plan 150.

In some embodiments, one or more devices (e.g., the control device 140) of the object treatment system 100 may process the plan image of the object 120, e.g., using a machine learning model to generate the treatment plan 150. For example, the plan image of the object 120 may be input into the machine learning model, and an output of the machine learning model may include the treatment plan 150, and the output treatment plan 150 may include one or more parameters of the treatment device 160 (e.g., the count of rays, angle data of each ray, the dose value and/or dose distribution data, the position of the multi-leaf collimator, the angle of the gantry, the rotation speed of the gantry, the angle of the collimator, the rotation direction of the collimator, the couch value, or the like, or any combination thereof.).

In some embodiments, the device(s) (e.g., the control device 140) of the object treatment system 100 may obtain historical data of the treatment plan 150 from an external source (e.g., an electronic medical record, a medical database, etc.) through a network (e.g., the network 170), and directly generate the treatment plan 150 according to the historical data of the treatment plan 150. The treatment plan 150 may be generated using various techniques, which are not limited in the present disclosure.

In some embodiments, a radiotherapy process of the object 120 may include a plurality of treatment fractions or stages, the treatment plan 150 may include a treatment plan for one of the treatment stages or fractions, or a treatment plan for the entire radiotherapy process. In some embodiments, the object treatment system 100 may determine one or more positioning points according to a position of the object 120 that the object 120 is initially positioned and mark the positioning point(s) on the plan image.

In some embodiments, the object treatment system 100 may generate positioning point information on the plan image. In some embodiments, the positioning point information may represent the positioning isocenter of the object 120. In some embodiments, the object treatment system 100 may determine the positioning point(s) based on the positioning of the object 120 and obtain the positioning point information of the positioning point(s). For example, the object treatment system 100 may determine three positioning points, positioning point A, positioning point B, and positioning point C. The positioning point A, the positioning point B, and the positioning point C may be located on a left side, a right side, and an upper side of the isocenter of the treatment device, respectively. In some embodiments, a first line passing the positioning point C and being vertical to a second line connecting the positioning point A and the positioning point B may intersect with the line connecting the positioning point A and the positioning point B. An intersection point of the first line and the second line may be regarded as the positioning isocenter. During positioning the object 120, the object 120 may be positioned, so that the positioning isocenter may coincide with the treatment isocenter of the treatment device 160.

In some embodiments, after positioning the object 120, a radiation imaging marker may be pasted on a surface of the object 120, and the radiation imaging marker may represent the position of the positioning isocenter. The plan image may include a representation of the radiation imaging marker, and the representation of the radiation imaging marker on the plan image may be regarded as the positioning point.

In some embodiments, the object treatment system 100 may determine whether the positioning isocenter coincides with the plan isocenter based on the positioning point information.

In some embodiments, when the treatment plan 150 is executed, a position of the object 120 corresponding to the plan isocenter may locate at the machine isocenter of the treatment device 160, and the use of the plan isocenter may improve the accuracy of the radiotherapy treatment performed on the object 120. By determining whether the positioning isocenter coincides with the plan isocenter, the object treatment system 100 may determine whether a difference is formed between the positioning isocenter and the plan isocenter before treating the object 120. In response to determining that the positioning isocenter coincides with the plan isocenter, the object treatment system 100 may determine that the position of the object 120 satisfies the treatment plan. During the treatment of the object 120, the object 120 may be returned to a position of the object 120 that the object 120 is initially positioned, and the plan isocenter of the object 120 may be located at the isocenter of the treatment device 160.

A coincidence of the positioning isocenter and the plan isocenter may refer that a difference between a coordinate of the positioning isocenter and a coordinate of the plan isocenter is less than a preset threshold. That is, if the difference between the coordinate of the positioning isocenter and the coordinate of the plan isocenter is greater than the preset threshold, it may be determined that the positioning isocenter does not coincide with the plan isocenter. In some embodiments, the preset threshold may be determined according to an actual condition. For example, the preset threshold may be different for target areas of different target portions. In some embodiments, the preset threshold may be within a range, such as a range from 0.1 to 0.5 mm. In some embodiments, the preset threshold may be one or more reference values, such as 0.1 mm, 0.2 mm, etc.

In some embodiments, in response to determining that the positioning isocenter does not coincide with the plan isocenter, the positioning device 110 and/or the treatment device 160 may be moved based on a difference between the positioning isocenter and the plan isocenter, so that a relative position of the positioning device 110 and the treatment device 160 may satisfy the treatment plan.

In some embodiments, a couch movement value may be determined based on the difference between the positioning isocenter and the plan isocenter. In subsequent operations, the positioning device 110 or other components (e.g., the couch board of the treatment couch) may be moved according to the couch movement value, so that the plan isocenter may be moved to coincide with the isocenter of the treatment device, and the relative position of the positioning device 110 and the treatment device 160 may satisfy the treatment plan.

In some embodiments, the plan isocenter may be determined in the plan image, and an internal anatomical structure of the object 120 may be displayed in the plan image. The positioning isocenter may be determined when the initial positioning of the patient is performed. In an initial positioning stage of the object 120, the positioning isocenter may be generally estimated based on the physiological structure of the object 120. Compared to the use of the positioning isocenter, the use of the plan isocenter may improve the position accuracy for positioning the target portion of the object 120 at the machine isocenter of the treatment device 160.

In some embodiments, the positioning device 110 may be automatically moved based on the plan isocenter, so that the relative position of the target portion of the object and the treatment device 160 may satisfy the treatment plan. In some embodiments, the object treatment system 100 may determine the couch movement value based on the difference between the positioning isocenter and the plan isocenter, and the couch movement value may be sent to a moving device (e.g., a moving device 180 shown in FIG. 5). In some embodiments, a movement value of the moving device 180 may be directly determined according to the couch movement value, and the moving device 180 may drive the positioning device 110 or other components (e.g., the couch board of the treatment couch) to move, so that the plan isocenter of the object 120 may coincide with the isocenter of the treatment device 160. More descriptions regarding the moving device 180 may be found elsewhere in the present disclosure. See, e.g., FIG. 5 and the relevant descriptions thereof.

In some embodiments, when the relative position of the target portion of the object and the treatment device 160 satisfies the treatment plan, an alignment device (e.g., the alignment device 190 shown in FIG. 5) may determine an alignment mark on the target portion of the object 120. The alignment mark may refer to a mark formed on the target portion by light emitted by the alignment device 190, and the alignment mark may be configured to be used to guide the object 120 to be reset.

In some embodiments, the radiotherapy treatment may be divided into a plurality of treatment stages or fractions. To facilitate the treatment device 160 to be aligned with the target portion of the object 120 when the object treatment system 100 performs a second treatment stage or fraction, or a treatment stage or fraction after the second treatment stage or fraction, a mark may be marked on a body surface of the object 120 to record the alignment mark formed by the alignment device 190 for resetting the object 120 in the subsequent treatment stage(s).

In some embodiments, the alignment device 190 may include one or more laser lights with fixed radiation angles. For example, the alignment device 190 may include at least two laser lights. Light emitted by the at least two laser lights may form one or more light marks on the body surface of the object 120 and light emitted from the at least two laser lights may converge at the isocenter of the treatment device 160. The operator may manually scribe a line according to the light mark, or control other mechanical devices (e.g., a robotic arm) to automatically scribe the line, which may be used to assist in determining the target portion (e.g., the position of the lesion) of the object 120. When the second treatment stage and/or a treatment stage after the second treatment stage is performed on the object 120, the scribed line may be overlapped with the light in a positioning stage. It should be noted that relevant operation(s) for generating the scribed line on the object 120 may be performed at any time after the plan isocenter is obtained or may be performed before or after a treatment stage.

In some embodiments, the treatment device 160 may guide the object 120 to be reset.

In some embodiments, first image data related to the object 120 may be obtained by the treatment device 160. The first image data may include information relating to the ROI associated with the target portion.

In some embodiments, in order to improve the treatment accuracy, the position of the patient may be verified under image guidance before performing radiotherapy treatment on the object 120. In some embodiments, after moving the target portion of the object 120 to the isocenter of the treatment device 160, the treatment device 160 may use a CBCT imaging device, an orthogonal X-ray imaging device, or a two-dimensional (2D) X-ray imaging device to obtain the first image data associated with the object 120. The first image data may include a 2D image or a three-dimensional (3D) image, and the first image data may display the ROI associated with the target portion. In some embodiments, the first image data may be registered with the plan image corresponding to the treatment plan of the object 120 to verify the position of the target portion of the object 120. The above-mentioned image guidance may include, but is not limited to, an electronic portal imaging device (EPID) image, a CT image, an MRI image, a CBCT image, a DR image, a PET image, an SPECT image, a PET-CT image, a PET-MR image, an ultrasound image, an ECT image, or the like, or any combination thereof. Those skilled in the art may also choose other verification techniques to verify the position of the patient.

In 250, the target portion of the object 120 may be treated using the treatment device 160 according to the treatment plan 150. In some embodiments, the treatment plan 150 may be determined based on the information of the target portion of the object 120 and the information of the ROI. For example, an optimal beam intensity distribution of each of radiation fields may be determined according to a prescribed dose of the target area and dose limitation of the organ at risk, so that an actual dose distribution formed in the object 120 may be close to the prescribed dose. As another example, the treatment device 160 may treat the target portion of the object 120 according to the count of rays radiated to the object 160, the angle data of each ray, the dose value and/or the dose distribution data, etc., in the treatment plan 150 to improve treatment accuracy of the object 120.

In some embodiments, the object treatment system 100 may automatically determine and optimize the treatment plan 150. In some embodiments, the doctor may optimize or update an initial treatment plan using an optimization technique. In some embodiments, one or more parameters of the initial treatment plan may be optimized using a fluence map optimization (FMO) technique, a direct aperture optimization (DAO) technique, or the like, or any combination thereof. In some embodiments, the doctor may confirm the optimized initial treatment plan. In some embodiments, the confirmation operation may be used to confirm whether the optimized initial treatment plan meets an expected requirement, such as an expected value of the radiation dose level. In response to that the optimized initial treatment plan does not meet the requirement, the optimization operation may be performed on the initial treatment plan. In response to that the optimized initial treatment plan meets the requirement, the doctor may confirm that the optimized initial treatment plan is the treatment plan (e.g., the treatment plan 150). In some embodiments, the doctor may also modify the optimized initial treatment plan and continue to optimize the optimized initial treatment plan to obtain a better optimization result.

In some embodiments, the object 120 may be fixed on the positioning device 110 during a period from a moment that the object is started to be fixed on the positioning device 110 to an end of the treatment of the object. In some embodiments, the object treatment system 100 may generate a prompt and transmit the prompt to the operator (e.g., the doctor) or the object 120 in a prompting manner to keep the object 120 to be fixed on the positioning device 110. More descriptions regarding fixing the object 120 on the positioning device 110 may be found elsewhere in the present disclosure. See, e.g., operation 210 and the relevant descriptions thereof.

In some embodiments, a time interval from the moment that the object is started to be fixed on the positioning device to an end of an initial treatment fraction of the object may be within a range from 10 minutes to 30 minutes. In some embodiments, the time interval from the moment that the object is started to be fixed on the positioning device to the end of the initial treatment fraction of the object may be no longer than 30 minutes. Based on a short-term radiotherapy workflow for the object 120, a continuous and integrated radiotherapy process may be implemented for the object 120, thereby improving the efficiency of determining the treatment plan and the entire radiotherapy process, improving the efficiency of implementing a process from positioning the object to treating the object at one time, reducing a plurality of unnecessary patient positioning processes, ensuring the consistency of a posture of the patient during the positioning process and the treatment process, and improving the treatment accuracy. For the operator, the workflow may be simplified and repeated operations may be avoided, thereby reducing errors. For a patient, a waiting time for the treatment may be reduced and a count of times for visiting a hospital may be reduced.

In some embodiments, when the treatment device 160 treats the target portion of the object 120, an actual dose distribution may be received using a detector of the treatment device 160. In some embodiments, the treatment device 160 may include the EPID. The EPID may be also referred to as a detector herein. The detector may be disposed on the gantry of the treatment device 160 relative to the treatment head of the treatment device 160. The detector and the treatment head may be respectively disposed above an upper side and/or below a lower side of the object 120, and the detector may receive the radiation beams emitted from the treatment head to receive the measured dose distribution.

In some embodiments, the treatment plan 150 may be verified in real time based on the measured dose distribution and the treatment plan 150. More descriptions regarding the real-time verification of the treatment plan 150 may be found elsewhere in the present disclosure. See, e.g., FIG. 3 and the relevant descriptions thereof.

Figure 3:
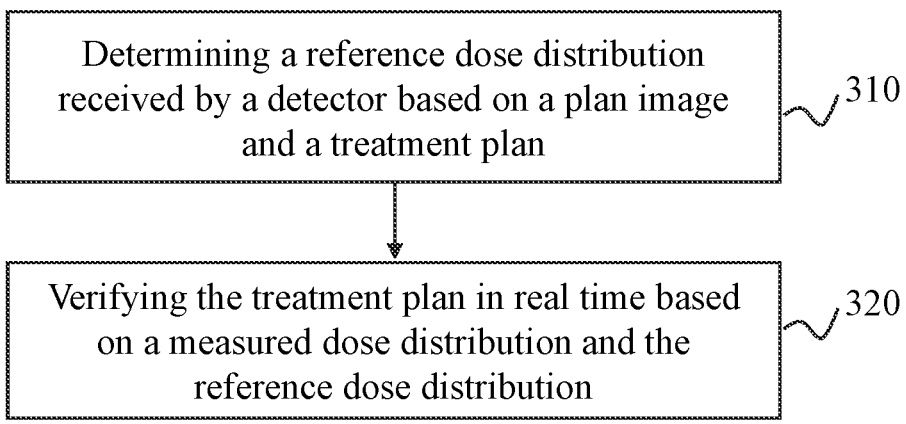
FIG. 3 is a flowchart illustrating an exemplary process for verifying a treatment plan in real time according to some embodiments of the present disclosure.

FIG. 3 is a flowchart illustrating an exemplary process for verifying a treatment plan in real time according to some embodiments of the present disclosure.

In some embodiments, at least a portion of the process 300 may be implemented by one or more devices or components of the object treatment system 100 shown in FIG. 1. The process 300 may include one or more of the following operations.

In 310, the object treatment system 100 may determine a reference dose distribution received by a detector based on a plan image and a treatment plan.

In some embodiments, the object treatment system 100 may determine the reference dose distribution received by the detector according to a treatment plan (e.g., treatment plan 150) and the plan image confirmed by a user. For example, tissue structure information of the object 120 may be obtained based on the plan image, and radiation beam parameters may be obtained based on the treatment plan 150. Information of radiation beams passing through the object 120 may be determined based on the tissue structure information and the radiation beam parameters using a simulative calculation technique. The reference dose distribution received by the detector from each radiation angle may be simulated based on the information of the radiation beams passing through the object 120 and an energy response of the detector.

In 320, the object treatment system 100 may verify the treatment plan 150 in real time based on the measured dose distribution and the reference dose distribution. In some embodiments, during the treatment of the object 120 using the treatment device 160, a value of the measured dose distribution received by the detector may be compared with a value of the reference dose distribution, and the treatment plan may be verified in real time. For example, in response to that a difference between the measured dose distribution and the reference dose distribution exceeds a preset range, the user may be prompted to stop the treatment device 160 for inspection.

In some embodiments, the object treatment system 100 may verify a position of the object 120 in real time through the detector. For example, the detector may obtain an EPID image of the object 120, and the object treatment system 100 may verify the position of the object 120 in real time by comparing a position of an ROI in the EPID image with a position of the ROI in the plan image. For example, in response to that a position difference between the plan isocenter of the object 120 and the machine isocenter of the treatment device 160 exceeds a threshold, the position of the object 120 may be not accurate and the object treatment system 100 may adjust the position of the object 120.

FIG. 4 is a block diagram illustrating an exemplary object treatment system according to some embodiments of the present disclosure.

As shown in FIG. 4, the object treatment system 100 may include the positioning device 110, the imaging device 130, a treatment device (e.g., the treatment device 160 in FIG. 1), and the control device 140.

The positioning device 110 may be configured to position an object (e.g., the object 120 in FIG. 1). The positioning device 110 may position the object 120 relative to the imaging device 130 and/or the treatment device 160. In some embodiments, the positioning device 110 may fix a target portion (e.g., the head, the limbs, etc.) or a whole body of the object 120. In some embodiments, the positioning device 110 may include a treatment couch having a positioning function. In some embodiments, the positioning device 110 may further include a component of the treatment couch, for example, a fixing rod, a fixing plate, a fixing frame, etc., which may be detachably disposed on the treatment couch. In some embodiments, the positioning device 110 may include a fixing component, for example, a vacuum pad, a mask, a foam rubber, a thermoplastic film, or the like. In some embodiments, the positioning device 110 may be customized for the object 120.

In some embodiments, the positioning device 110 may position the object 120 relative to the imaging device 130 and/or the treatment device 160. That is, the positioning device 110 may position the target portion of the object 120 at an isocenter of the imaging device 130 to be scanned, or an isocenter of the treatment device 160 to be treated.

More descriptions regarding the positioning device 110 may be found elsewhere in the present disclosure. See, e.g., FIG. 7 and the relevant descriptions thereof.

The imaging device 130 may be configured to image the object 120. In some embodiments, the imaging device 130 may include a CT imaging device, an MRI device, a CBCT imaging device, a DR device, a PET imaging device, an SPECT imaging device, a PET-CT imaging device, a PET-MR imaging device, an ultrasound device, an ECT imaging device, or the like, or any combination thereof. More descriptions regarding imaging the object 120 using the imaging device 130 may be found elsewhere in the present disclosure. See, e.g., FIG. 2 and the relevant descriptions thereof.

The treatment device 160 may be configured to treat the target portion of the object 120 based on a treatment plan (e.g., the treatment plan 150 in FIG. 1). In some embodiments, the treatment device 160 may include a linear accelerator (LINAC), a heavy ion therapy device, a neutron therapy device, a proton therapy device, a gamma knife, or the like, or any combination thereof.

In some embodiments, the treatment device 160 may treat the target portion of the object 120 using different energy and/or different types of rays generated by various accelerators. In different application scenarios, the treatment device 160 may include a device having different functions. Specifically, in radiotherapy treatment, the treatment device 160 may include a gamma knife and a linear accelerator. In cargo examination, the treatment device 160 may include an explosive imaging device. In a living body scan, the treatment device 160 may include a sampling device. In an interventional treatment, the treatment device 160 may include a surgical robot.

In some embodiments, the imaging device 130 and the treatment device 160 may be coplanar so that an isocenter of the imaging device 130 may coincide with the isocenter of the treatment device 160. On this occasion, a plan isocenter of the target portion of the object 120 before and/or during the radiotherapy may coincide with the isocenter of the imaging device 130 and/or the isocenter of the treatment device 160, thereby reducing a movement of the object 120 between the imaging device 130 and the treatment device 160 and improving imaging and/or treatment accuracy of the treatment performed on the object 120.

The control device 140 may be configured to generate information of an ROI based on the plan image acquired by the imaging device 130, obtain a plan isocenter, and determine the treatment plan 150 based on the plan isocenter and the information of the ROI.

It should be noted that the positioning device 110, the imaging device 130, the treatment device 160, and the control device 140 in the object treatment system 100 may be configured to implement a portion of operations of the object treatment method, respectively. The specific functions of each device/component may refer to the corresponding operations implemented when the object treatment method is executed, which is not repeated herein. Furthermore, those skilled in the art may set various devices/components such as the positioning device 110, the imaging device 130, the treatment device 160, the control device 140, etc., in the object treatment system 100 according to actual needs, which is not limited or further illustrated in the present disclosure.

FIG. 5 is a block diagram illustrating an exemplary object treatment system according to some embodiments of the present disclosure.

In some embodiments, the object treatment system 100 may include the positioning device 110, the imaging device 130, the control device 140, and the treatment device 160. In some embodiments, the object treatment system 100 may further include a moving device 180. The moving device 180 may be configured to automatically move the positioning device 110 and/or the treatment device 160 based on a plan isocenter, so that a relative position of the target portion of the object and the treatment device 160 may satisfy a treatment plan (e.g., the treatment plan 150 in FIG. 1).

In some embodiments, the moving device 180 may include at least a portion of the fixing device 110. For example, the moving device 180 may include a treatment couch having a moving function. A position of a couch board of the treatment couch may be moved by a driving component of the treatment couch to satisfy the treatment plan 150.

In some embodiments, the moving device 180 may include a mechanical device having an automatic moving function. For example, the moving device 180 may include an intelligent mechanical cart. In some embodiments, the moving device 180 may further include a driving component having an automatic driving function. For example, the moving device 180 may include a driving wheel, a driving chain, etc. integrated on the positioning device 110.

In some embodiments, the moving device 180 may move the positioning device 110 according to a couch movement value determined based on the plan isocenter and a positioning isocenter, so that the plan isocenter may be moved to coincide with the isocenter of the treatment device 160.

In some embodiments, the object treatment system 100 may further include an alignment device 190. The alignment device 190 may be configured to determine an alignment mark on the target portion of the object 120. The alignment mark may be configured to be used to guide the object 120 to be reset. In some embodiments, the alignment device 190 may include a laser light. More descriptions regarding that the alignment device 190 guides the object 120 to be reset may be found elsewhere in the present disclosure. See, e.g., FIG. 2 and the relevant descriptions thereof.

In some embodiments, the object treatment system 100 may further include a processor 191. The processor 191 may be configured to perform at least one of the following operations: reconstructing a plan image based on image data of the object 120, determining the treatment plan 150 based on the plan image, and/or verifying the treatment plan 150. In some embodiments, the processor 191 may be an independent component. Conventionally, the above operations may be performed by the imaging device 130, the control device 140, and the treatment device 160, respectively. The processor 191 may implement the execution of the operations of one or more devices/components in the object treatment system 100, so as to implement an integrated radiotherapy workflow for the object 120. In some embodiments, the processor 191 may be an independent component. In some embodiments, the processor 191 may be integrated into the imaging device 130, the control device 140, or the treatment device 160. In some embodiments, the reconstructing the plan image, the determining the treatment plan, and verifying the treatment plan may be performed by the processor 191.

Figure 6:
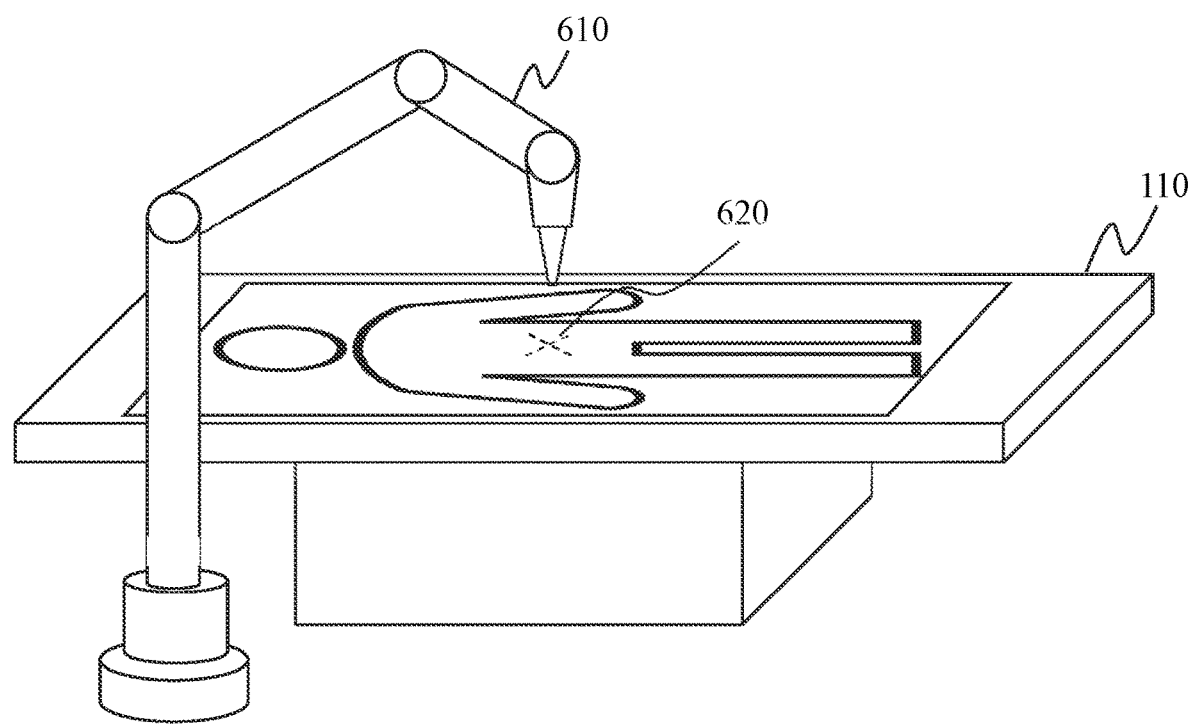
FIG. 6 is a schematic diagram illustrating a scribing operation performed on a target portion by a scribing device according to some embodiments of the present disclosure.

FIG. 6 is a schematic diagram illustrating a scribing operation performed on a target portion by a scribing device according to some embodiments of the present disclosure.

In some embodiments, the object treatment system 100 may further include a scribing device. The scribing device may perform a scribing operation on a target portion of an object (e.g., the object 120 in FIG. 1) based on a treatment plan (e.g., the treatment plan 150 in FIG. 1) to obtain at least one scribing mark 620.

As shown in FIG. 6, the scribing device may include a robot arm 610. The robot arm 610 may contact a body surface of the object through one or more motions, such as expansion, movement, rotation, etc. Based on the treatment plan 150, the robot arm 610 may perform the scribing operation on the target portion of the object 120 to obtain at least one scribing mark 620. For example, the robot arm 610 may clamp a marker pen for performing the scribing operation. The robot arm 610 may receive information such as information of an ROI, a plan isocenter, etc., in the treatment plan, and determine a distance or range of the robot arm 610 that needs to move and/or expand based on the above information to drive the clamped marker pen to perform the scribing operation on the target portion of the object 120 to obtain the scribing mark 620. A center of the scribing mark 620 may be located at a machine isocenter of a treatment device (e.g., the treatment device 160 in FIG. 1, FIG. 4, and/or FIG. 5), so that when the object returns to the positioning device 110 again, it may be reset according to the scribing mark 620.

In some embodiments, the scribing device may be manually controlled to perform the scribing operation. In some embodiments, an alignment device (e.g., the alignment device 190 in FIG. 5) (e.g., a laser light having a fixed radiation angle) may be disposed on the scribing device. For example, at least two laser lights may be disposed on the scribing device, the light emitted by the laser light may generate light marks on the body surface of the object, and the lights emitted from different laser lights may converge at the isocenter of the treatment device 160. An operator may control the robot arm 610 to perform the scribing operation according to the light marks to scribe a line on the body surface of the object 120 to assist in determining a position of the object 120.

In some embodiments, the object treatment system 100 may further include an automatic scribing tool. The automatic scribing tool may refer to a software tool that controls the scribing device to perform the scribing operation, and the automatic scribing tool may be installed in a control device (e.g., the control device 140). Specifically, the automatic scribing tool may be configured to send an instruction to the scribing device to direct the scribing device to perform the scribing operation.

In some embodiments, the scribing mark 620 may be generated by the scribing operation, and the scribing operation may be automatically performed by the scribing device based on the treatment plan. Specifically, the automatic scribing tool may determine an operation instruction based on the treatment plan. The operation instruction may indicate the movement path of the robot arm 610 of the scribing device, and the robot arm 610 may draw the line on the target portion based on the operation instruction.

In some embodiments, the operation instruction may be manually determined by a user, for example, the user may draw a line on the target portion according to the light irradiated by the laser light.

In some embodiments, the operation instruction may be automatically determined by the object treatment system 100. The operation instruction confirmed by the object treatment system 100 may be input to the automatic scribing tool to control the scribing device to scribe the target portion.

In some embodiments, the operation instruction may be determined in other manners, and the manner(s) may be determined according to an actual situation.

In some embodiments, the scribing operation may be performed during the determination of the treatment plan or may be performed before or after the initial treatment.

Figure 7:
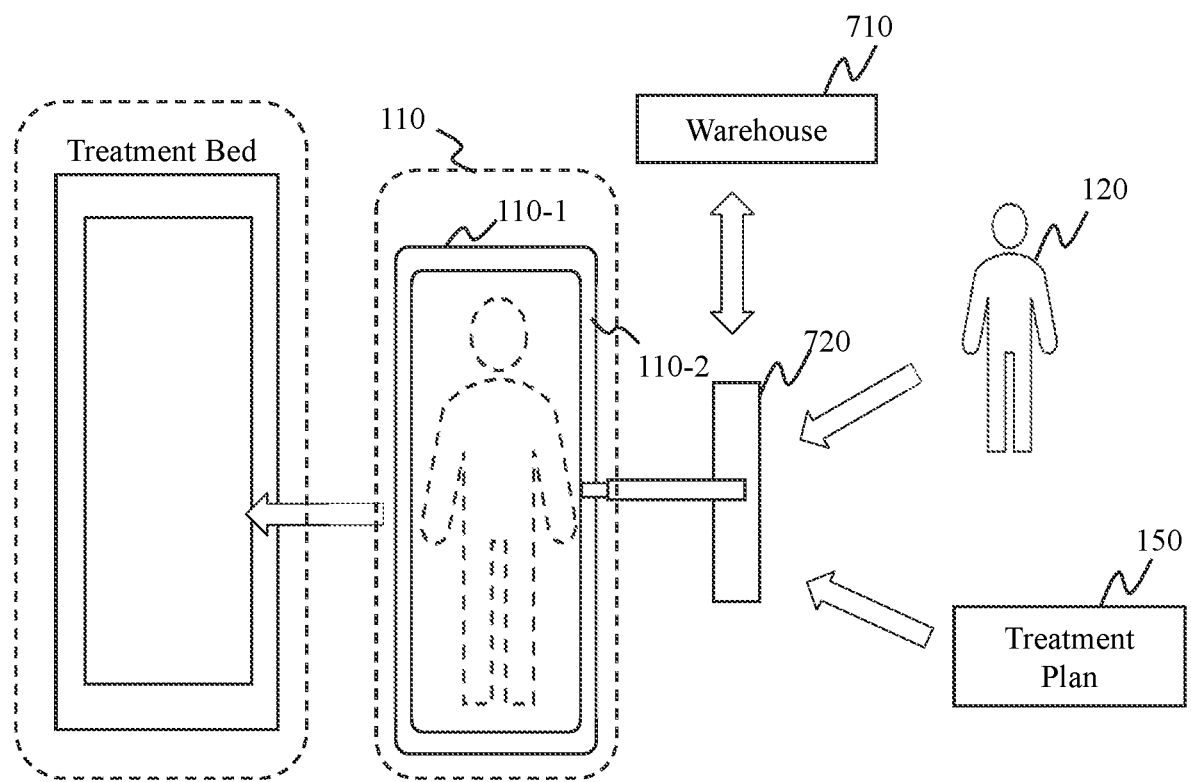
FIG. 7 is a schematic diagram illustrating an exemplary positioning device according to some embodiments of the present disclosure.

FIG. 7 is a schematic diagram illustrating an exemplary positioning device according to some embodiments of the present disclosure.

As shown in FIG. 7, the positioning device 110 of the object treatment system 100 may include a housing 110-1, and a material 110-2 filled in a space defined by the housing 110-1.

In some embodiments, the positioning device 110 may include a vacuum pad. In some embodiments, the vacuum pad may include the housing 110-1, and the material 110-2 filled in the space defined by the housing 110-1. In some embodiments, the housing 110-1 may be made of a soft and flexible material, such as an air-impermeable material, a thermoplastic material, a heat-resistant material, or the like, or any combination thereof. In some embodiments, the housing 110-1 may include a valve (not shown in FIG. 7) connected to a vacuum source (e.g., a vacuum compressor, a vacuum pump, etc.). The valve may be disposed on an upper surface of the housing 110-1. The valve may be configured to inflate and/or deflate the vacuum pad. For example, a partial vacuum may be generated by using a vacuum pump to extract air from the vacuum pad through the valve. The vacuum pad may be placed on a couch board of a treatment couch, an object 120 may be placed on the vacuum pad, and the vacuum pad may match a body contour of the object. The vacuum pad may maintain a shape to record positioning information of the object when the vacuum pad is vacuumed. In treatment stages of the object, the vacuum pad with the positioning information may be used to reset the object.

In some embodiments, the material 110-2 may be filled in the area defined by the housing 110-1. For example, the material 110-2 may be filled in the area inside the housing 110-1. The material 110-2 may include foam particles, sponges, cotton, or the like, or any combination thereof. The foam particles may include a polymeric material such as a resin, a fiber, a rubber, or the like, or any combination thereof. The resin may include phenol-formaldehyde, urea-formaldehyde, melamine-formaldehyde, epoxy resin, polyurethane, polyimide, polymethyl methacrylate (PMMA), acrylonitrile butadiene styrene (ABS), polyamide, polylactic acid (PLA), polybenzimidazole (PBI), polycarbonate (PC), polyethersulfone (PES), polyether ether ketone (PEEK), polyethylene (PE), polyphenylene ether (PPO), polyphenylene sulfide (PPS), polypropylene (PP), polystyrene (PS), polyvinyl chloride (PVC), etc. The sponge may include natural cellulose, foam resin, etc. The foam resin may include polyether, polyester, polyvinyl alcohol, etc. In a natural state (e.g., the vacuum operation is not performed), the material 110-2 may move freely in the housing 110-1. After performing the vacuuming operation on the vacuum pad (or the housing 110-1), the movement of the material 110-2 may be restricted so that the shape formed by the housing 110-1 may be consistent with the contour of the object 120.

In some embodiments, the positioning device 110 may include a thermoplastic pad. The thermoplastic pad may refer to a pad that may be deformed under an action of heat. The thermoplastic pad may include a housing made of a thermoplastic material. As another example, the thermoplastic pad may include a housing, and a material filled in an area defined by the housing. The filling material of the thermoplastic pad may include a thermoplastic material. The thermoplastic pad may be deformed under the action of heat. The positioning information of the object 120 may be recorded based on the deformation of the thermoplastic pad.

In some embodiments, the positioning device 110 may be taken from a warehouse 710 by an operator (e.g., a doctor, a technician, etc.) who executes the treatment plan 150 and placed on the treatment couch to perform related operations in a subsequent treatment plan (e.g., the treatment plan 150 in FIG. 1).

In some embodiments, the positioning device 110 may be taken by an automatic pickup device 720 from the warehouse, and placed on the treatment couch to perform related operations in the subsequent treatment plan. Specifically, the automatic pickup device 720 may determine a position of the positioning device 110 in the warehouse 710 according to the information of the object 120 and the treatment plan 150, and may automatically pick up the corresponding positioning device 110 from the warehouse 710 based on the determined position information of the positioning device 110.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. It should be noted that if the description, definition, and/or terms used in the appended application of the present disclosure is inconsistent or conflicting with the content described in the present disclosure, the use of the description, definition and/or terms of the present disclosure shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method for treating an object, comprising:
   imaging, using an imaging device, an object fixed on a positioning device to obtain a plan image of the object;
   generating, based on the plan image of the object, information of a region of interest (ROI) of the object;
   generating, based on the information of the ROI, a treatment plan, the treatment plan including a plan isocenter on the plan image, the plan isocenter referring to a point defined in the plan image and the point defined in the plan image representing a point of the object located at a machine isocenter of a treatment device when the object is treated; and
   treating, based on the treatment plan, a target portion of the object using the treatment device, the object being fixed on the positioning device from a moment that the object is started to be imaged by the imaging device to obtain the plan image to an end of the treatment of the target portion.

2. The method of claim 1, further comprising:
   generating positioning point information based on the plan image, the positioning point information indicating a positioning isocenter associated with the object; and
   determining, based on the positioning point information, whether the positioning isocenter coincides with the plan isocenter.

3. The method of claim 2, further comprising:
   in response to determining that the positioning isocenter does not coincide with the plan isocenter, causing, based on a difference between the positioning isocenter and the plan isocenter, the positioning device or the treatment device to move, such that a relative position of the positioning device and the treatment device satisfies the treatment plan.

4. The method of claim 2, wherein generating positioning point information based on the plan image, the positioning point information indicating a positioning isocenter associated with the object includes:
   determining positioning points from the plan image based on the ROI represented in the plan image; and
   determining the positioning isocenter based on the positioning points.

5. The method of claim 1, further comprising:
   causing, based on the plan isocenter, the positioning device to move automatically, such that a relative position of the target portion of the object and the treatment device satisfies the treatment plan.

6. The method of claim 5, further comprising:
   determining, using an alignment device, an alignment mark on the target portion of the object after the relative position of the target portion of the object and the treatment device satisfies the treatment plan, the alignment mark being configured to be used to guide the object to be reset.

7. The method of claim 6, further comprising:
   obtaining, by the treatment device, first image data associated with the object, the first image data including information relating to the ROI associated with the target portion; and
   resetting the object based on a comparison of the first image data and the plan image.

8. The method of claim 1, further comprising:
   receiving, using a detector of the treatment device, a measured dose distribution when the treatment device is treating the target portion of the object; and
   verifying, based on the measured dose distribution and the treatment plan, the treatment plan in real time.

9. The method of claim 8, wherein the verifying, based on the measured dose distribution and the treatment plan, the treatment plan in real time includes:
   determining, based on the plan image and the treatment plan, a reference dose distribution received by the detector; and
   verifying, based on the measured dose distribution and the reference dose distribution, the treatment plan in real time.

10. The method of claim 1, further comprising:
    in response to obtaining the information of the ROI, prompting the information of the ROI to an operator for direct confirmation or confirmation after modification.

11. The method of claim 1, further comprising:
receiving confirmation information of a user, the confirmation information being associated with confirmation of a workflow; and
automatically generating the information of the ROI.

12. The method of claim 1, wherein a time interval from the moment that the object is started to be imaged by the imaging device to obtain the plan image to an end of an initial treatment fraction of the object is no longer than 30 minutes.

13. The method of claim 1, wherein the object is fixed on the positioning device through an intelligent guidance device.

14. The method of claim 1, wherein the treatment plan includes dose information associated with the target portion of the object.

15. The method of claim 1, wherein generating, based on the information of the ROI, a treatment plan includes:
generating the treatment plan by inputting the plan image into a machine learning model, the treatment plan including dose information of the object and a couch code value.

16. The method of claim 1, further comprising:
generating a prompt; and
transmitting the prompt to an operator or the object in a prompting manner to keep the object fixed on the positioning device.

17. The method of claim 9, wherein determining, based on the plan image and the treatment plan, a reference dose distribution received by the detector includes:
determining tissue structure information of the object based on the plan image;
obtaining radiation beam parameters based on the treatment plan;
determining information of radiation beams passing through the object based on the tissue structure information and the radiation beam parameters using a simulative calculation technique; and
determining the reference dose distribution based on the information of the radiation beams passing through the object and an energy response of a detector of the treatment device.

18. A system for treating an object, comprising a positioning device, an imaging device, a treatment device, and a control device, wherein
the positioning device is configured to position an object relative to the imaging device or the treatment device
the imaging device is configured to image the object to obtain a plan image of the object;
the treatment device is configured to treat a target portion of the object based on a treatment plan generated based on the plan image; and
the control device is configured to:
generate, based on the plan image, information of a target area of the target portion,
obtain a plan isocenter, and
determine the treatment plan based on the plan isocenter and the information of the target area, the plan isocenter referring to a point defined in the plan image and the point defined in the plan image representing a point of the object located at a machine isocenter of the treatment device when the object is treated;
wherein the object is fixed on the positioning device from a moment that the object is started to be imaged by the imaging device to obtain the plan image to an end of treatment of the target portion.

19. The system of claim 18, further comprising a scribing device configured to perform a scribing operation on a target portion of an object, wherein the scribing device includes a robot arm, and a movement plan of the robot arm is determined based on the treatment plan by an automatic scribing tool,
the positioning device is configured to position an object relative to the imaging device or the treatment device through an intelligent guidance device;
the control device is configured to:
determine positioning points from the plan image based on the information of the target area; and
determine a positioning isocenter of the positioning points;
determine whether the positioning isocenter coincides with the plan isocenter.

20. A non-transitory computer readable medium, comprising at least one set of instructions, wherein when executed by one or more processors of a computing device, the at least one set of instructions causes the computing device to perform a method, the method comprising:
imaging, using an imaging device, an object fixed on a positioning device to obtain a plan image of the object;
generating, based on the plan image of the object, information of a region of interest (ROI) of the object;
generating, based on the information of the ROI, a treatment plan, the treatment plan including a plan isocenter on the plan image, the plan isocenter referring to a point defined in the plan image and the point defined in the plan image representing a point of the object located at a machine isocenter of the treatment device when the object is treated;
treating, based on the treatment plan, a target portion of the object using a treatment device, the object being fixed on the positioning device from a moment that the object is started to be imaged by the imaging device to obtain the plan image to an end of the treatment of the target portion.

* * * * *